United States Patent [19]
Pezzoli et al.

[11] Patent Number: 5,491,011
[45] Date of Patent: Feb. 13, 1996

[54] THERMOPLASTIC MULTILAYER ETHYLENE POLYMER SHEET FOR CONTAINMENT OF ODORIFEROUS PRODUCT COMPONENTS

[75] Inventors: Paul Pezzoli; Randal Bollinger, both of Topeka, Kans.

[73] Assignee: Colgate-Palmolive Company, Piscataway, N.J.

[21] Appl. No.: 186,243

[22] Filed: Jan. 25, 1994

[51] Int. Cl.⁶ .................................... B29D 22/00
[52] U.S. Cl. .................. 428/36.7; 428/34.7; 428/215; 428/515; 428/516; 428/903.3
[58] Field of Search .................. 428/36.7, 349, 428/516, 34.7

[56] References Cited

U.S. PATENT DOCUMENTS 5,153,039  10/1992  Porter et al. .................. 428/36.92
5,225,256  7/1993   Marano et al. ................. 428/34.2
5,316,826  5/1994   Kotani et al. ................. 428/172

*Primary Examiner*—Edith Buffalow
*Attorney, Agent, or Firm*—Paul Shapiro; Robert C. Sullivan

[57] ABSTRACT

A recyclable multilayer ethylene polymer sheet structure for constructing a package to hold bulk products such as dry pet food having an odoriferous component, the sheet having, from the inner surface contacting the product, to the outer non-product contacting surface the structure:

LLDPE/HDPE/LLDPE/BR/LDPE where LLDPE is a linear low density polyethylene, HDPE is a high density polyethylene and BR is an odor barrier resin such as ethylene vinyl alcohol copolymer having odor barrier properties and LDPE is low density polyethylene.

7 Claims, 1 Drawing Sheet

LINEAR LOW POLYETHYLENE - 11
HIGH DENSITY POLYETHYLENE - 12
LINEAR LOW DENSITY POLYETHYLENE - 13
BARRIER RESIN - 14
LOW DENSITY POLYETHYLENE - 15

LINEAR LOW POLYETHYLENE - 11
HIGH DENSITY POLYETHYLENE - 12
LINEAR LOW DENSITY POLYETHYLENE - 13
BARRIER RESIN - 14
LOW DENSITY POLYETHYLENE - 15

FIG. I

THERMOPLASTIC MULTILAYER ETHYLENE POLYMER SHEET FOR CONTAINMENT OF ODORIFEROUS PRODUCT COMPONENTS

BACKGROUND OF THE INVENTION

1. Field of the Invention

The present invention relates to a thermoplastic multilayer sheet for packaging granular bulk materials such as dry pet food, and in particular, a thermoplastic multilayer ethylene polymer sheet which is recyclable and when formed into a packaging construction such as a bag prevents the emanation of odoriferous components of the packaged product from escaping into the atmosphere.

2. The Prior Art

Dry pet food is typically sold, for reasons of economy and convenience, in bulk quantities. Pet food which contains animal fat and protein ingredients emits an odor when stored. The pet food, in the form of pellets, is normally packaged in plastic-lined paper bags or wax-lined paper bags which are effective to prevent the emission of odor during the time the pet food product is shipped and stored.

A problem with the packaging normally used for pet food is the material of construction. As pet food bags for example are generally multi-substrate systems combining paper or wax-paper and plastic, the disposal of such multi-substrate packaging is uneconomic and injurious to the environment. Packaging constructed of multilayer like substrate materials would allow recycling of the packaging with the attendant environmental and economic advantages thereof.

Thermoplastic sheet, and in particular polyolefin sheet materials, have been used for some time in connection with packaging of various articles including food products which require resistance to abuse and stress, an attractive shelf appearance, and protection from the environment during the distribution cycle. When it is normally attempted to manufacture pet food bags using a single substrate multilayer system such as polyolefin laminate sheet which would be recyclable, it is found that when pet food products are packaged in such bags, and particularly high grain content pet food coated with grease for paintability, the packaged pet food product when stored in an enclosed area for a limited period of time, e.g., a day or less, emanates a disagreeable odor, which odor is offensive to anyone entering the area. Bags manufactured from a multilayer sheet of low density polyethylene, linear low density polyethylene or a combination of these polymeric materials in addition to poor odor retention, exhibit poor stiffness properties, This latter defect results in poor shelf presence when the packaged pet food product is made available for sale in retail stores resulting in limited acceptance of the packaged product by pet owners.

There is therefore a need in the art for a recyclable plastic bag used for the packaging of odoriferous materials which not only has suitable odor retention characteristics, but one which also has consumer acceptability with respect to its appearance.

SUMMARY OF THE INVENTION

In accordance with the present invention there is provided a recyclable multi-layered sheet for constructing a package such as a bag, for the packaging of odoriferous bulk materials such as pet food, which provides odor barrier properties with respect to the containment within the package of odors emanating from the material, the multilayer sheet being constructed of ethylene polymer layers which comprise a three layer coextrudate having a core layer of high density polyethylene sandwiched between first and second layers of linear low density polyethylene, a layer of ethylene polymer odor barrier material adhered to the first of the linear low density polyethylene layers and a layer of low density polyethylene adhered to the ethylene polymer odor barrier layer. In forming a package such as a bag from the multilayer sheet the low density polyethylene layer constitutes the outer non-contact product layer of the package, which may be reverse printed, for graphics presentation and the second linear low density polyethylene layer forms the inner, product contact side of the package.

Packages, such as bags, formed from the multilayer sheet of the present invention have been found to be excellent flexible, self-supporting, grease resistant packages particularly suitable for packaging dry, high grain content grease coated pet food. Such bags retain high fatty-acid greases and undesirable pet food odors; provide puncture resistance for the containment of abrasive high grain content pet foods, have no detrimental effect on product palatability and have sufficient stiffness to permit the package to project a superior shelf image. As all the layers of the multilayer sheet material are formed from an ethylene polymer, the bag material after use is completed is recyclable into any ethylene polymer waste stream and presents no environmental hazard if incinerated as no acid or ozone depleting by-products are generated by incineration.

BRIEF DESCRIPTION OF THE DRAWINGS

FIG. 1 is a schematic cross-sectional elevation of a multilayer sheet material of present invention.

DETAILED DESCRIPTION OF THE INVENTION

In manufacturing the multi-layer sheet of the present invention intended for bag applications, it has been found that certain particularly desirable physical characteristics should be exhibited by the individual layers. For example, in bag constructions, the bag is preferably stiff and self-supporting and has good abrasion resistance, i.e., has a relatively high tensile modulus.

In manufacturing the multilayer ethylene polymer sheet of the present invention the linear low density layers each comprise about 35% to 40% of the total multilayer sheet thickness; the high density polyethylene layer comprises about 22.5% to 27.5% of the sheet thickness, low density polyethylene about 20% to 25% of the total sheet thickness and the barrier layer 7% to 8% of the total sheet thickness. Preferably, the barrier layer is an ethylene vinyl alcohol copolymer.

The total thickness of the multi-layer sheet of the present invention is preferably between about 5 and 8 mils, and more preferably between about 6 and 7 mils. Even more preferably, the multi-layer sheet of the present invention is about 6.5 mils thick.

Referring to FIG. 1, the embodiment of the present invention shown comprises a multilayer sheet structure 10 having a first layer 11 of linear low density polyethylene having a thickness of about 0.5 to about 2.0 mils and preferably about 1.0 to about 1.5 mils.

The term "linear low density polyethylene" (LLDPE), is used herein to refer to copolymers of ethylene with one or more comonomers selected from $C_4$ to $C_{10}$ alpha oleofins such as butene-1, octene, etc. in which the molecules of the copolymers comprise long chains with few side chain branches or cross-linked structures. This molecular structure is to be contrasted with conventional low or medium density polyethylenes which are more highly branched than their respective counterparts.

Linear low density polyethylene as defined herein has a density usually in the range of from about 0.916 grams per cubic centimeter to about 0.925 grams per cubic centimeter (g/cc).

Commercially available linear low density polyethylene resins suitable for use to prepare the multilayer sheet of the present invention include those available under the trade designation Dowlex 2265A available from Dow Chemical Company. This linear low density polyethylene resin has a density of 0.924 g/cc.

The linear low density polyethylene resin used in the manufacture of the multilayer sheet of the present invention may have blended therewith other polymeric materials such as low density polyethylene, ultralow density polyethylene representing about 1% to about 10% of the blend composition as well as slip or anti-block agents representing about 0.25 to about 1% by weight of the blend composition.

The linear low density polyethylene first layer 11 imparts puncture resistance to the bag, is readily heat sealable and is inert with respect to palatibility loss in grease coated pet food products.

Adhered to and preferably coextruded with the linear low density polyethylene layer 11 is a layer 12 of high density polyethylene having a thickness of about 1.0 to about 3.0 mils and preferably about 1.5 to 2.0 mils.

The term "high density polyethylene" (HDPE) is used herein to refer to a homopolymer of ethylene having a density between about 0.945 to about 0.955 g/cc. The high density polyethylene layer 12 imparts grease resistance, improved stiffness, i.e. high tensile modulus, to the sheet structure. Generally a high density polyethylene which when extruded into film exhibits a tensile modulus of 50,000 to 80,000 psi and a tensile strength of 2000 to 6000 psi will impart sufficient stiffness and strength to the bag to render the bag substantially self-supporting and to provide the packaged product with acceptable consumer appeal.

Coextrusion coated or laminated onto the opposite side of the high density polyethylene layer 12, is a second layer of linear low density polyethylene 13 having a composition substantially identical to the first layer 11 of linear low density polyethylene previously described. The second linear low density polyethylene layer 13 has a thickness of about 1.0 to about 3.0 mils and preferably about 1.5 to about 2.0 mils. Adhered to linear low density layer 13 is polymeric barrier layer 14. The linear low density polyethylene layer 13 provides puncture resistance to the barrier layer 14 and serves as a tie layer to the barrier layer 14.

The barrier material layer 14 can be an ethylene vinyl alcohol copolymer; a polyamide polymer or copolymer; or an acrylonitrile polymer or copolymer. To provide for a recyclable multilayer sheet product, the barrier layer 14 is preferably formed from an ethylene polymer such as an ethylene vinyl alcohol copolymer having gas barrier properties.

Ethylene content for the ethylene vinyl alcohol copolymer is preferably between about 20% and 40% by weight and more preferably between about 30 and 36% by weight. An ethylene content of about 32% by weight is most preferred. Such resins have a melt index between about 2 to 10 grams/10 minutes (ASTM D-1238). Commercially available resins suitable for the ethylene vinyl alcohol barrier layer 14 include Eval (trademark) available from Evalca Company.

The barrier layer 14 can have a thickness of about 0.25 to about 0.75 mil and preferably about a thickness of 0.3 to about 0.6 mil. Adhered to the second side of the barrier layer 14 is a layer 15 comprised of low density polyethylene having a density in the range of about 0.9 to about 0.93 g/cc and a melt index of about 0.8. The layer 15 has a thickness of about 1.5 to about 2.0 mils.

The low density polyethylene layer 15 forms the outside layer of the multiwalled package manufactured from the sheet 10, and provides structural integrity, clarity and gloss for graphics presentation on the bag.

Although specific coating techniques have been described, any appropriate technique for applying the layers of the multilayer sheet 10 can be suitably employed, such as extrusion or coextrusion coating, emulsion or solution coating, or coextrusion laminations of single or multilayered films.

In preferred method for manufacturing the multilayer sheet 10 of the present invention linear low density polyethylene resin and any processing aid as a blend is fed into the hoppers of separate processing extruders which feed a coextrusion die. The linear low density polyethylene is extruded at temperatures of from about 400° to about 450° F. The high density polyethylene resin, is likewise fed into a separate processing extruder which feeds the same coextrusion die. The high density polyethylene resin is extruded at a temperature of from about 400° F. to about 450° F. The materials are coextruded as a relatively thick tube or "tape" which has an initial diameter dependent upon the diameter of the coextrusion die. Circular coextrusion dies are well known to those in the art and can be purchased from a number of manufacturers. In addition to tubular coextrusion, slot dies can be used to coextrude the material in sheet form. Thereafter the low density polyethylene resin and barrier resin are fed to individual extruders and extruded at 400°–450° F. and 325°–375° F. respectively and laminated sequentially to the coextruded LLDPE/HDPE/LLDPE structure.

The multilayer sheet of the present invention can be conveniently formed into sealed packages such as bags whereby odoriferous and/or other fugitive product components are prevented from escaping to the atmosphere. Bags formed from the multilayer ethylene polymer sheet of the present invention are particularly appropriate for packaging odoriferous pet foods, animal feeds and agricultural chemicals which are to be stored in enclosed areas for extended periods of time. The bags after use can be safely incinerated and/or recycled preventing waste disposal problem deleterious to the environment.

EXAMPLE

A multilayer ethylene polymer sheet was made by coextruding at 420° F. a coextrudate having a core layer of a 1.6 mil thick high density polyethylene (density 0.945 g/cc, melt Index=0.2) sandwiched between two 1.2 mil thick layers of linear low density polyethylene (density 0.924 g/cc, melt index=0.2) and laminating to one of the linear low density layers, at 350° F., a 0.5 mil thick layer of ethylene vinyl alcohol copolymer having an ethylene content of 32% and thereafter laminating to the ethylene vinyl alcohol copolymer layer at 420° F. a 1.5 ml thick layer of low density polyethylene (density=0.925 g/cc, melt index=0.8). The finished film had a thickness of about 6.5 mil.

The multilayer sheet product had the following physical properties:

| Tensile strength (psi) | |
|---|---|
| Machine direction | 3000 |
| Transverse direction | 2100 |
| Elongation at break (%) | |
| Machine direction | 300 |
| Transverse direction | 600 |
| Tensile Modulus (psi) | |
| Machine direction | 67,000 |
| Transverse direction | 78,000 |
| $O_2$ transmission rate | |
| (cc STP/24 hours, $m^2$ atmosphere) @73° F. | 0.4 |

Dry high grain content dog food was packaged in 4×4 inch sealed bags fabricated from the multilayer sheet prepared in the Example.

For purposes of comparison, the above procedure was repeated with the exception that comparative bags were formed from multilayer ethylene polymer materials of various combinations of LDPE, LLDPE, and HDPE with thickness ranging from 6.6 to 13 mils.

An odor test was conducted wherein dry high grain content grease coated dog food was packaged in bags manufactured from the multilayer sheet of the Example and the sealed bags stored in a controlled temperature room at 100° F. The air surrounding the bags was evaluated at one hour intervals for the first 24 hours of storage and then daily thereafter. No odor could be detected after 34 days of storage.

When the same odor test was conducted using dry high grain content grease coated dog food filled bags constructed from the comparative sheets, odor developed outside all the bags within 1 hour of their placement in the controlled temperature room. Within 24 hours of storage, the odor was evaluated as objectionable and unacceptable.

While the invention has been illustrated and described as embodied in an improved recyclable bag formed from the multilayer sheet of the present invention for containment of odors emanating from dry pet food product, it is not intended to be limited to the details shown, since various other uses, modifications and structural changes may be made without departing in any way from the spirit of the present invention.

What is claimed is:

1. A recyclable multilayer sheet for constructing packages for products having odoriferous fugitive components the multilayer sheet comprising a three layer coextrudate having a core layer of high density polyethylene sandwiched between first and second layers of linear low density polyethylene, a layer comprised of an polymeric odor barrier material adhered to the one of the linear low density polyethylene layers and a layer of low density polyethylene adhered to the odor barrier material.

2. The multilayer sheet of claim 1 wherein the odor barrier material is an ethylene polymer.

3. The multilayer sheet of claim 1 wherein the odor barrier material is an ethylene vinyl alcohol polymer.

4. The multilayer sheet of claim 3 wherein the ethylene vinyl alcohol copolymer has an ethylene content of about 30% to about 36% by weight.

5. The multilayer sheet of claim 1 wherein the sheet has a tensile modulus of 50,000 to 80,000 psi.

6. The multilayer sheet of claim 1 wherein the linear low density polyethylene layers have a thickness between about 1.0 and about 3.0 mils, the high density polyethylene layer has a thickness of about 1.0 to about 3.0 mils and the low density polyethylene has a thickness of about 1.5 to about 2.0 mils the barrier layer has a thickness of about 0.25 to about 0.75 mils.

7. A multilayered package for products having odoriferous components prepared from the sheet of claim 1.

\* \* \* \* \*